(12) United States Patent
Chadalapaka et al.

(10) Patent No.: US 7,617,376 B2
(45) Date of Patent: Nov. 10, 2009

(54) METHOD AND APPARATUS FOR ACCESSING A MEMORY

(75) Inventors: Mallikarjun Chadalapaka, Roseville, CA (US); Dwight L. Barron, Houston, TX (US); Paul R. Culley, Tomball, TX (US); Jeffrey R. Hilland, Cypress, TX (US); James G. Wendt, Loomis, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 457 days.

(21) Appl. No.: 10/641,127

(22) Filed: Aug. 14, 2003

(65) Prior Publication Data

US 2005/0038941 A1  Feb. 17, 2005

(51) Int. Cl.
  *G06F 12/00* (2006.01)
(52) U.S. Cl. .................. 711/206; 711/153
(58) Field of Classification Search .................. 711/206
  See application file for complete search history.

(56) References Cited

U.S. PATENT DOCUMENTS

| | | | |
|---|---|---|---|
| 5,325,532 A | 6/1994 | Crosswy et al. | |
| 5,675,807 A | 10/1997 | Iswandhi et al. | |
| 5,737,604 A | 4/1998 | Miller et al. | |
| 5,751,932 A | 5/1998 | Horst et al. | |
| 5,809,285 A | 9/1998 | Hilland | |
| 5,815,707 A | 9/1998 | Krause et al. | |
| 5,822,571 A | 10/1998 | Goodrum et al. | |
| 5,870,568 A | 2/1999 | Culley et al. | |
| 5,872,941 A | 2/1999 | Goodrum et al. | |
| 5,914,953 A | 6/1999 | Krause et al. | |
| 5,948,111 A | 9/1999 | Taylor et al. | |
| 5,964,835 A | 10/1999 | Fowler et al. | |
| 5,978,858 A | 11/1999 | Bonola et al. | |
| 5,983,269 A | 11/1999 | Mattson et al. | |
| 6,018,620 A | 1/2000 | Culley et al. | |
| 6,038,621 A | 3/2000 | Gale et al. | |
| 6,047,323 A | 4/2000 | Krause | |
| 6,070,198 A | 5/2000 | Krause et al. | |
| 6,070,253 A | 5/2000 | Tavallaei et al. | |
| 6,157,967 A | 12/2000 | Horst et al. | |
| 6,163,834 A | 12/2000 | Garcia et al. | |
| 6,226,732 B1 * | 5/2001 | Pei et al. ................... | 711/207 |
| 6,233,702 B1 | 5/2001 | Horst et al. | |
| 6,272,613 B1 * | 8/2001 | Bouraoui et al. ........... | 711/204 |

(Continued)

FOREIGN PATENT DOCUMENTS

EP    0757318 A2    2/1997

OTHER PUBLICATIONS

U.S. Appl. No. 10/400,313, filed Mar. 27, 2003, entitled Protection Domain Groups, Inventor: Jeffrey R. Hilland et al.

(Continued)

*Primary Examiner*—Matt Kim
*Assistant Examiner*—Ryan Dare

(57) ABSTRACT

The disclosed embodiments relate to an optimized memory registration mechanism that may comprise an upper layer protocol that associates I/O buffers with memory regions and that manages steering tags. The memory regions may be associated with a translation page table. The upper layer protocol may allocate one of the steering tags associated with at least one of the memory regions for a memory operation.

20 Claims, 4 Drawing Sheets

U.S. PATENT DOCUMENTS

| | | | |
|---|---|---|---|
| 6,289,023 B1 | 9/2001 | Dowling et al. | |
| 6,301,647 B1 * | 10/2001 | Green | 711/207 |
| 6,484,208 B1 | 11/2002 | Hilland | |
| 6,493,343 B1 | 12/2002 | Garcia et al. | |
| 6,496,940 B1 | 12/2002 | Horst et al. | |
| 6,502,203 B2 | 12/2002 | Barron et al. | |
| 7,010,633 B2 * | 3/2006 | Arndt et al. | 710/243 |
| 2002/0042868 A1 * | 4/2002 | Godtland et al. | 711/209 |
| 2004/0049580 A1 * | 3/2004 | Boyd et al. | 709/226 |
| 2004/0049600 A1 * | 3/2004 | Boyd et al. | 709/250 |
| 2004/0073622 A1 * | 4/2004 | McDaniel et al. | 709/212 |
| 2004/0098369 A1 * | 5/2004 | Elzur | 707/1 |
| 2004/0193734 A1 * | 9/2004 | Barron et al. | 709/250 |
| 2004/0193811 A1 * | 9/2004 | Chadalapaka et al. | 711/147 |
| 2004/0193825 A1 * | 9/2004 | Garcia et al. | 711/170 |
| 2004/0193832 A1 * | 9/2004 | Garcia et al. | 711/202 |
| 2004/0193833 A1 * | 9/2004 | Hampton et al. | 711/206 |
| 2004/0210693 A1 * | 10/2004 | Zeitler et al. | 710/100 |
| 2004/0225720 A1 * | 11/2004 | Pinkerton | 709/212 |

OTHER PUBLICATIONS

U.S. Appl. No. 10/401,234, filed Mar. 27, 2003, entitled Queue Pair/Window Association, Inventor: David J. Garcia et al.

U.S. Appl. No. 10/401,232, filed Mar. 27, 2003, entitled Physical Mode Addressing, Inventor: Kathryn Hampton et al.

U.S. Appl. No. 10/401,230, filed Mar. 27, 2003, entitled Physical Mode Windows, Inventor: David J. Garcia et al.

U.S. Appl. No. 10/401,237, filed Mar. 27, 2003, entitled Method and Apparatus for Performing Connection Management with Multiple Stacks, Inventor: Prashant Modi et al.

U.S. Appl. No. 10/401,233, filed Mar. 27, 2003, entitled Atomic Operations, Inventor: Dwight L. Barron et al.

U.S. Appl. No. 10/401,236, filed Mar. 27, 2003, entitled Signal Packet, Inventor: Dwight L. Barron.

U.S. Appl. No. 10/401,231, filed Mar. 27, 2003, entitled Shared Receive Queues, Inventor: Mallikarjun Chadalapaka et al.

U.S. Appl. No. 10/401,235, filed Mar. 27, 2003, entitled Binding A Memory Window to A Queue Pair, Inventor: David J. Garcia et al.

Jeffrey R. Hilland et al., "RDMA Prototcol Verbs Specification (Version 1.0)" (Apr. 2003).

* cited by examiner

METHOD AND APPARATUS FOR ACCESSING A MEMORY

BACKGROUND OF THE RELATED ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In the field of computer systems, it may be desirable for information to be transferred from a system memory associated with one computer system to a system memory associated with another computer system. The information may be transmitted by upper layer protocols ("ULP"), which may be referred to as consumers, through a network that connects the computer systems together. Many protocols or strategies for transferring data between the memories of computer systems employ queue pairs ("QPs"). Each QP may include a send queue ("SQ") and a receive queue ("RQ"). Typically, each computer involved in a transfer will have both a send queue and a receive queue.

Queue pairs may be defined to expose a memory segment, such as a memory window or memory region, within the local system to a remote system. The information about the memory windows and memory regions may be maintained within a memory translation and protection table ("TPT"). The entries in the TPT may be accessed by steering tags ("STags"), which indicate a specific entry within the TPT. In addition to the TPT, a physical address table ("PAT") may be implemented to convert the fields of the in the TPT to physical addresses of memory.

However, before the memory segments may be accessed, either locally or remotely, the upper layer protocols may perform various steps to exchange information relating to the memory segment. For instance, the memory segment may first be registered to allow access to that memory segment from the local system or a remote system. Upon completion of the registration, the upper layer protocol may create and send a message with the information relating to the memory segment. The registration process is time consuming and expensive in terms of computing resources. As such, for each command sent from the upper layer protocol, the extensive registration process may result in excessive delays and inefficiencies in the operation of the computer system.

BRIEF DESCRIPTION OF THE DRAWINGS

Advantages of the invention may become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The Remote Direct Memory Access ("RDMA") Consortium, which includes the assignee of the present invention, is developing specifications to improve ability of computer systems to remotely access the memory of other computer systems. One such specification under development is the RDMA Consortium Protocols Verb specification, which is hereby incorporated by reference. The verbs defined by this specification may correspond to commands or actions that may form a command interface for data transfers between memories in computer systems, including the formation and management of queue pairs, memory windows, protection domains and the like.

RDMA may refer to the ability of one computer to directly place information in the memory space of another computer, while minimizing demands on the central processing unit ("CPU") and memory bus. In an RDMA system, an RDMA layer may interoperate over any physical layer in a Local Area Network ("LAN"), Server Area Network ("SAN"), Metropolitan Area Network ("MAN"), or Wide Area Network ("WAN").

Figure 1:
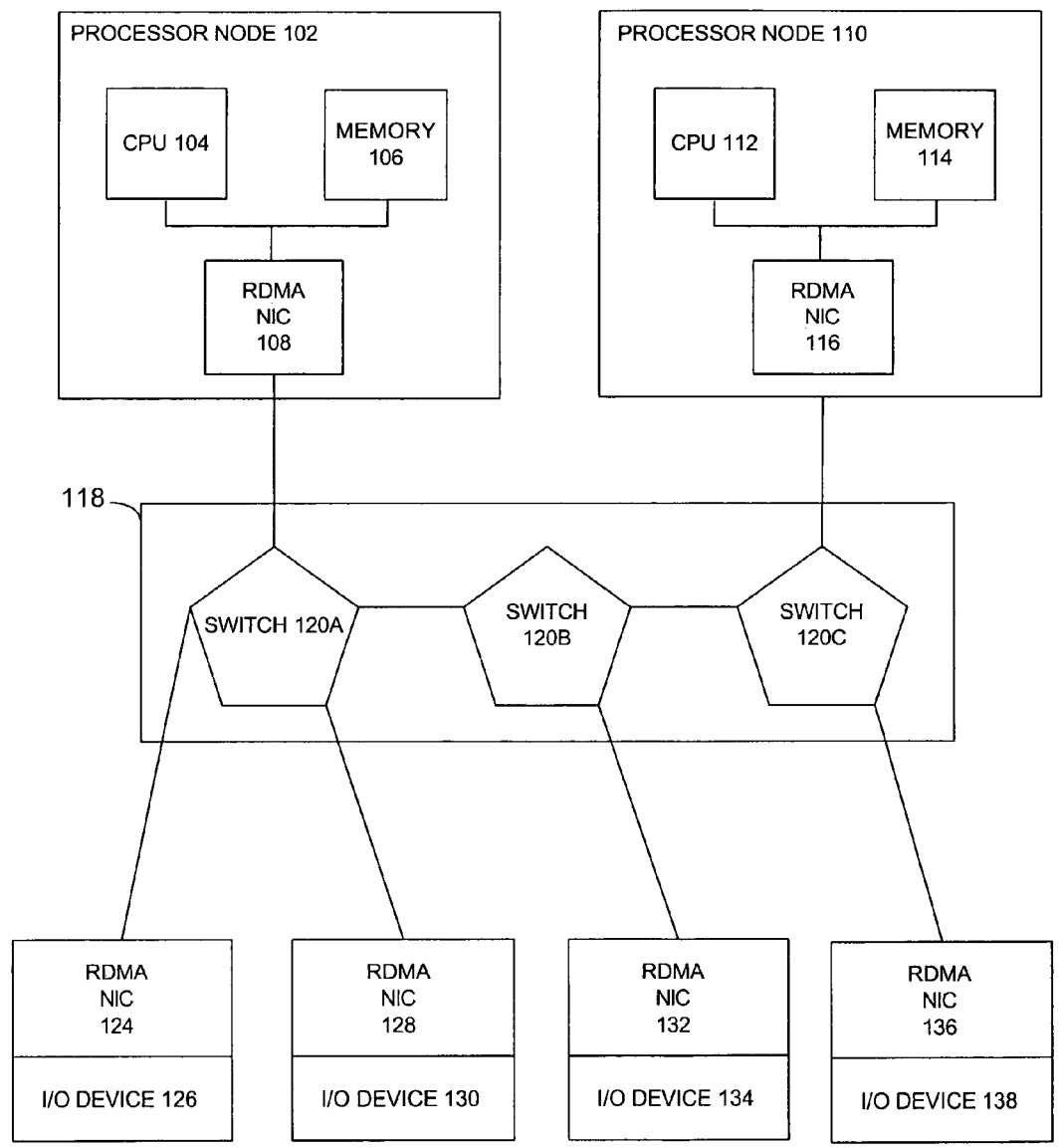
FIG. 1 is a block diagram illustrating a computer network in accordance with embodiments of the present invention.

Referring now to FIG. 1, a block diagram illustrating a computer network in accordance with embodiments of the present invention is illustrated. The computer network is indicated by the reference numeral 100 and may comprise a first processor node 102 and a second processor node 110, which may be connected to a plurality of I/O devices 126, 130, 134, and 138 via a switch network 118. Each of the I/O devices 126, 130, 134 and 138 may utilize a Remote Direct Memory Access-enabled Network Interface Card ("RNIC") to communicate with the other systems. In FIG. 1, the RNICs associated with the I/O devices 126, 130, 134 and 138 are identified by the reference numerals 124, 128, 132 and 136, respectively. The I/O devices 126, 130, 134, and 138 may access the memory space of other RDMA-enabled devices via their respective RNICs and the switch network 118.

The topology of the network 100 is for purposes of illustration only. Those of ordinary skill in the art will appreciate that the topology of the network 100 may take on a variety of forms based on a wide range of design considerations. Additionally, NICs that operate according to other protocols, such as InfiniBand, may be employed in networks that employ such protocols for data transfer.

The first processor node 102 may include a CPU 104, a memory 106, and an RNIC 108. Although only one CPU 104 is illustrated in the processor node 102, those of ordinary skill in the art will appreciate that multiple CPUs may be included therein. The CPU 104 may be connected to the memory 106 and the RNIC 108 over an internal bus or connection. The memory 106 may be utilized to store information for use by the CPU 104, the RNIC 108 or other systems or devices. The memory 106 may include various types of memory such as Static Random Access Memory ("SRAM") or Dynamic Random Access Memory ("DRAM").

The second processor node 110 may include a CPU 112, a memory 114, and an RNIC 116. Although only one CPU 112 is illustrated in the processor node 110, those of ordinary skill in the art will appreciate that multiple CPUs may be included therein. The CPU 112, which may include a plurality of processors, may be connected to the memory 114 and the RNIC 116 over an internal bus or connection. The memory 114 may be utilized to store information for use by the CPU 112, the RNIC 116 or other systems or devices. The memory 114 may utilize various types of memory such as SRAM or DRAM.

The switch network 118 may include any combination of hubs, switches, routers and the like. In FIG. 1, the switch network 118 comprises switches 120A-120C. The switch 120A connects to the switch 120B, the RNIC 108 of the first processor node 102, the RNIC 124 of the I/O device 126 and the RNIC 128 of the I/O device 130. In addition to its connection to the switch 120A, the switch 120B connects to the switch 120C and the RNIC 132 of the I/O device 134. In addition to its connection to the switch 120B, the switch 120C connects to the RNIC 116 of the second processor node 110 and the RNIC 136 of the I/O device 138.

Each of the processor nodes 102 and 110 and the I/O devices 126, 130, 134, and 138 may be given equal priority and the same access to the memory 106 or 114. In addition, the memories may be accessible by remote devices such as the I/O devices 126, 130, 134 and 138 via the switch network 118. The first processor node 102, the second processor node 110 and the I/O devices 126, 130, 134 and 138 may exchange information using queue pairs ("QPs"). The exchange of information using QPs is explained with reference to FIG. 2.

Figure 2:
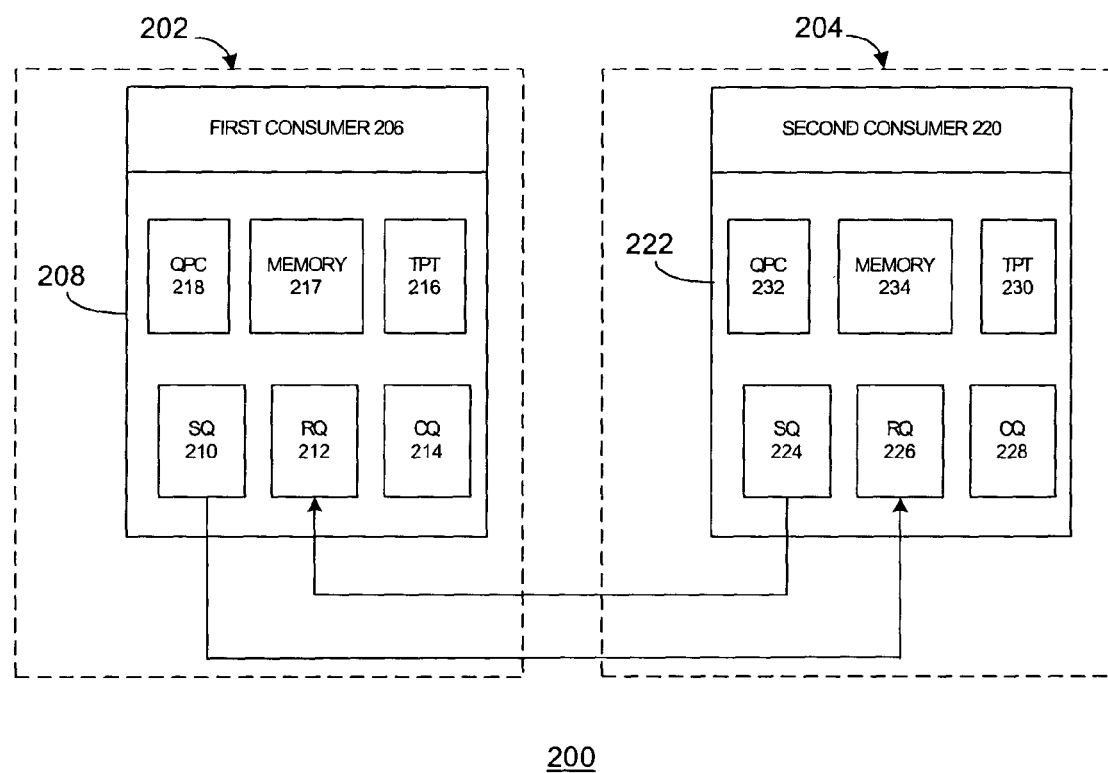
FIG. 2 is a block diagram that illustrates the use of a queue pair to transfer data between devices in accordance with embodiments of the present invention.

FIG. 2 is a block diagram that illustrates the use of a queue pair to transfer data between devices in accordance with embodiments of the present invention. The figure is generally referred to by the reference numeral 200. In FIG. 2, a first node 202 and a second node 204 may exchange information using a QP. The first node 202 and second node 204 may correspond to any two of the first processor node 102, the second processor node 110 or the I/O devices 126, 130, 134 and 138 (FIG. 1). As set forth above with respect to FIG. 1, any of these devices may exchange information in an RDMA environment.

The first node 202 may include a first consumer 206, which may interact with an RNIC 208. The first consumer 206 may comprise a software process that may interact with various components of the RNIC 208. The RNIC 208, may correspond to one of the RNICs 108, 116, 126, 130, 134 or 138 (FIG. 1), depending on which of devices associated with those RNICs is participating in the data transfer. The RNIC 208 may comprise a send queue 210, a receive queue 212, a completion queue ("CQ") 214, a memory translation and protection table ("TPT") 216, a memory 217 and a QP context 218.

The second node 204 may include a second consumer 220, which may interact with an RNIC 222. The second consumer 220 may comprise a software process that may interact with various components of the RNIC 222. The RNIC 222, may correspond to one of the RNICs 108, 116, 126, 130, 134 or 138 (FIG. 1), depending on which of devices associated with those RNICs is participating in the data transfer. The RNIC 222 may comprise a send queue 224, a receive queue 226, a completion queue 228, a TPT 230, a memory 234 and a QP context 232.

The memories 217 and 234 may be registered to different processes, each of which may correspond to the consumers 206 and 220. The memories 217 and 234 may comprise a portion of the main memory of the nodes 202 and 204, memory within the RNICs 208 and 222, or other memory associated with the nodes 202 and 204. The queues 210, 212, 214, 224, 226, or 228 may be used to transmit and receive various verbs or commands, such as control operations or transfer operations. The completion queue 214 or 228 may store information regarding the sending status of items on the send queue 210 or 224 and receiving status of items on the receive queue ("RQ") 212 or 226. The TPT 216 or 230 may comprise a simple table or an array of page specifiers that may include a variety of configuration information in relation to the memories 217 or 234.

The QP associated with the RNIC 208 may comprise the send queue 210 and the receive queue 212. The QP associated with the RNIC 222 may comprise the send queue 224 and the receive queue 226. The arrows between the send queue 210 and the receive queue 226 and between the send queue 224 and the receive queue 212 indicate the flow of data or information therebetween. Before communication between the RNICs 208 and 222 (and their associated QPs) may occur, the QPs may be established and configured by an exchange of commands or verbs between the RNIC 208 and the RNIC 222. The creation of the QP may be initiated by the first consumer 206 or the second consumer 220, depending on which consumer desires to transfer data to or retrieve data from the other consumer.

Information relating to the configuration of the QPs may be stored in the QP context 218 of the RNIC 208 and the QP context 232 of the RNIC 222. For instance, the QP context 218 or 232 may include information relating to a protection domain ("PD"), access rights, send queue information, receive queue information, completion queue information, different modes of tags, or information about a local port connected to the QP and/or remote port connected to the QP. However, it should be appreciated that the RNIC 208 or 222 may include multiple QPs that support different consumers with the QPs being associated with one of a number of CQs.

To prevent interferences in the memories 217 or 234, the memories 217 or 234 may be divided into memory regions ("MRs"), which may contain memory windows ("MWs"). An entry in the TPT 216 or 230 may describe the memory regions and may include a virtual to physical mapping of a portion of the address space allocated to a process. A physical address table ("PAT") may also be used to perform memory mapping. Memory regions may be registered with the associated RNIC 208 or 222 and the operating system ("OS"). The nodes 202 and 204 may send a unique steering field or steering tag ("STag") to identify the memory 217 or 234 to be accessed, which may correspond to the memory region or memory window. Access to a memory region by a designated QP may be restricted to STags that have the same protection domain.

The STag may identify a buffer, within the memory 217 or 234, being referenced for a given data transfer. A tagged offset ("TO") may be associated with the STag and may correspond to an offset into the associated buffer. Alternatively, a transfer may be identified by a queue number, a message sequence number and message offset. The queue number may be a 32-bit field, which identifies the queue being referenced. The message sequence number may be a 32-bit field that may be used as a sequence number for a communication, while the message offset may be a 32-bit field offset from the start of the message.

To access one of the memories 217 and 234, the consumer 206 or 220 may issue a verb or command that may result in the generation of a request, such as an RDMA read or write request or a work request ("WR"). For example, the request may be a WR, which may include a list of memory locations that may have data that is to be accessed. This list, which may be referred to as a scatter/gather list ("SGL"), may reference the TPT 216 or 230. The SGL may be a list or collection of information in a table or array that may point to local data segments of the memory 217 or 234. For instance each element in the SGL may include a local STag, local tagged offset (i.e. virtual address), and length. The interaction between the consumer 206 or 220 and the memory 217 or 234 in the context of data transfers employing STags is explained with reference to FIG. 3.

Figure 3:
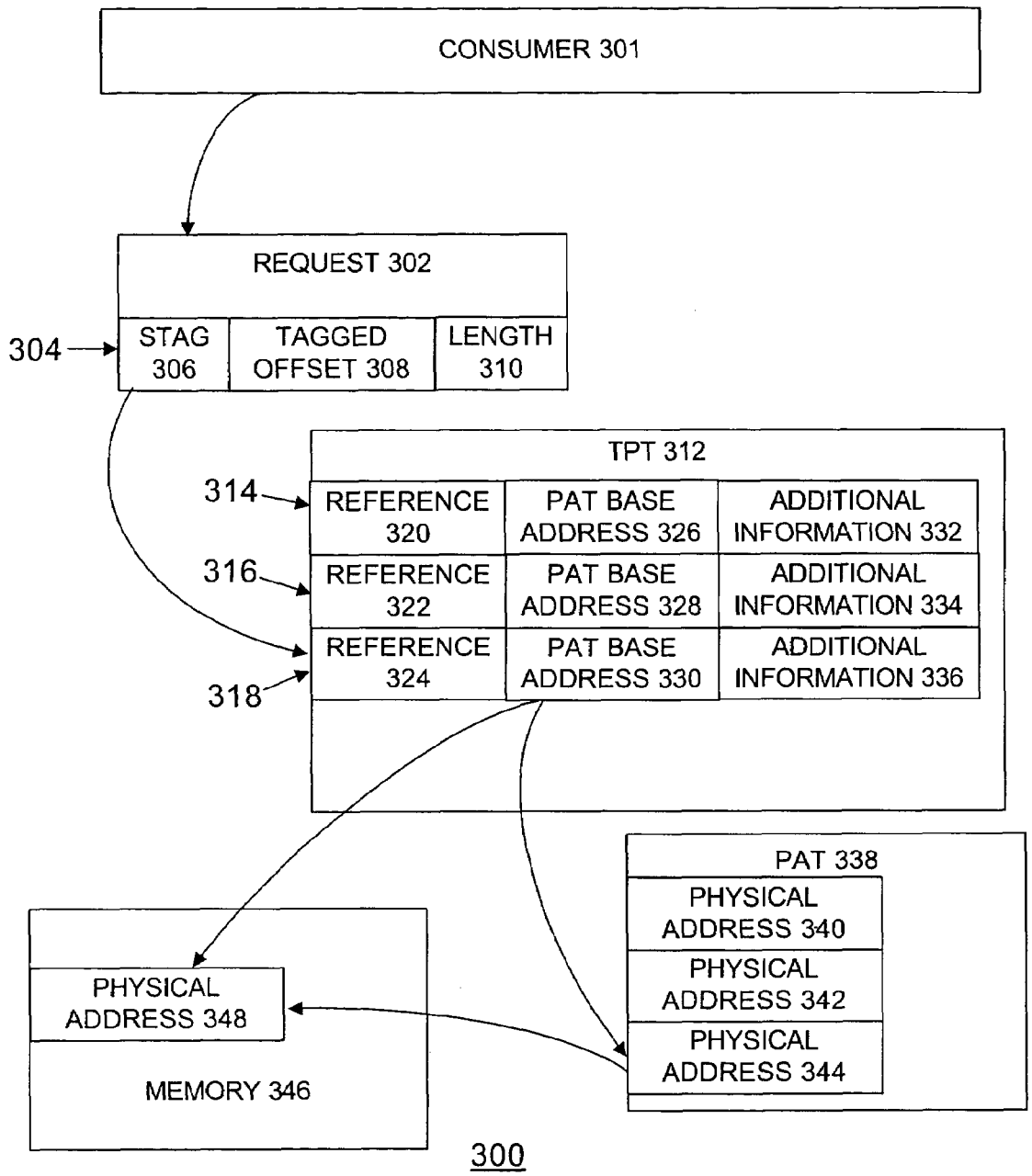
FIG. 3 is a block diagram showing the processing of a memory request from a consumer to memory employing an STag in accordance with embodiments of the present invention.

FIG. 3 is a block diagram showing the interaction of a consumer and memory by employing STags in accordance with embodiments of the present invention. The diagram shown in FIG. 3 is generally referred to by the reference numeral 300. In this diagram 300, a consumer 301, which may be an upper layer protocol, external device, the first consumer 206, or the second consumer 220 of FIG. 2 or the like, may issue a request 302 to access a location in a memory 346, which may be the memory 217 or 234 of FIG. 2. The request 302 may include an STag 306 that references an entry in a TPT 312, which may be the TPT 216 or 230 of FIG. 2. The TPT entries 314-318 may reference a physical address table ("PAT") 338 that may in turn reference a segment 348 of memory 346. By using this memory access mechanism, the consumer 301 may use the STag 306 to access the memory segment 348.

For the consumer 301 to access the memory 346, the request 302 may include various fields and information that indicate and control the access to the specific location within the memory 346. For instance, the request 302 may correspond to a memory access operation and may include an SGL element 304. The SGL element 304 may include information, such as the STag 306, a tagged offset 308, and a length 310. The STag 306 may be a 32 bit identifier that is used to access memory 217 or 234. To function as an identifier, the STag 306 may be divided into fields of steering information, such as an STag Key and an STag Index. The STag Key may be provided by the consumer 301 for error detection and correction or to provide security. Also, the STag Index may be managed by the RNIC, such as RNIC 208 or 222 of FIG. 2, to refer entries in the TPT 312. Furthermore, the tagged offset 308 ("TO") may identify the offset in an appropriate buffer or, alternatively, a physical address. The length 310 may be the base and bounds of the memory segment 348 that is being referenced.

In accessing the TPT 312, the STag 306 within the SGL element 304 may correspond to a specific entry 314-318 within the TPT 312, which may correspond to the TPTs 216 and 230 of FIG. 2. The TPT entries ("TPTE") 314-318 each may describe an associated memory region or memory window that also includes various fields regarding the location and access rights for the memory segment, such as the memory segment 348. Each of the TPTEs 314-318 may include a group of reference bits 320-324, physical address table ("PAT") base address bits 326-330 and additional information bits 332-336. The reference bits 320-324 may relate the STag 306 to a specific entry within the TPT 312. For instance, if the STag 306 includes the reference bits 324, then the request 302 may be directed to the TPTE 318. The additional information bits 332-336 may include access controls, key instance data, protection domain data, protection validation bits, window reference count, physical address table size, page size, first page offset, length, or a physical address table pointer, for example.

To access the memory segment 348, the PAT base addresses 326-330 may be utilized for either virtual addressing or physical addressing. For instance, in virtual addressing, the requesting consumer, such as consumer 301, may not have data about the physical address configuration of the memory 348 being accessed. In that situation, the PAT base addresses 326-330, which may correspond to a base address of the PAT 338, may be combined with a portion of the TO 308 to index the PAT 338. The combination may access a corresponding physical address 340-344 in the PAT 338. The combination of the PAT base address 326-330 with at least a portion of the TO 308 may be an arithmetic combination that is subject to adjustment depending on attributes of the associated memory location, memory region, or memory window that is the memory segment 348. The physical addresses 340-344 of the PAT 338 may correspond to the memory segment 348. For instance, the PAT base address 330 may include the physical address 344 in the PAT 338, which references the memory segment 348.

Alternatively, if physical addressing is utilized, then the PAT base address 326-330 may correspond to the memory segment 348. In this situation, the PAT Base addresses 326-330 may relate to the specific locations in the memory 346. For instance, if the PAT base address 330 may include the memory address of the memory segment 348. As such, access to the TPTE 318 may provide the physical address of the memory segment 348 without the use of the PAT 338.

In accessing the specific entries 314-318 of the TPT 312, the STAG 306 within the request 302 may be created and managed through different processes. For instance, the STag 306 may be created through a normal process that involves registering the memory 346, which may form a regular STag. The regular STag may be created upon the issuance of a command from the consumer 301. Also, the STag 306 may be created through a fast process that involves preregistering STags so that the memory registration is done before a request is received, which may form a Physical STag. The Physical STag may be created prior to the command being issued from the consumer 30i, which may reduce delays by removing the memory registration process from the path of issuing a command. For instance, if a large data exchange is sent from the consumer, the regular STag may be formed with the memory registration being absorbed by the volume of exchanges that may take place. However, when a single command is being sent from the consumer 301, the slow process with the memory registration delays the transfer of the command. In this single command or smaller transfer, the physical STag may benefit the system because the delay incurred due to resource allocations associated with the memory registration is completed before the command is issued. The operation of these two STag processes is shown in greater detail in FIG. 4.

Figure 4:
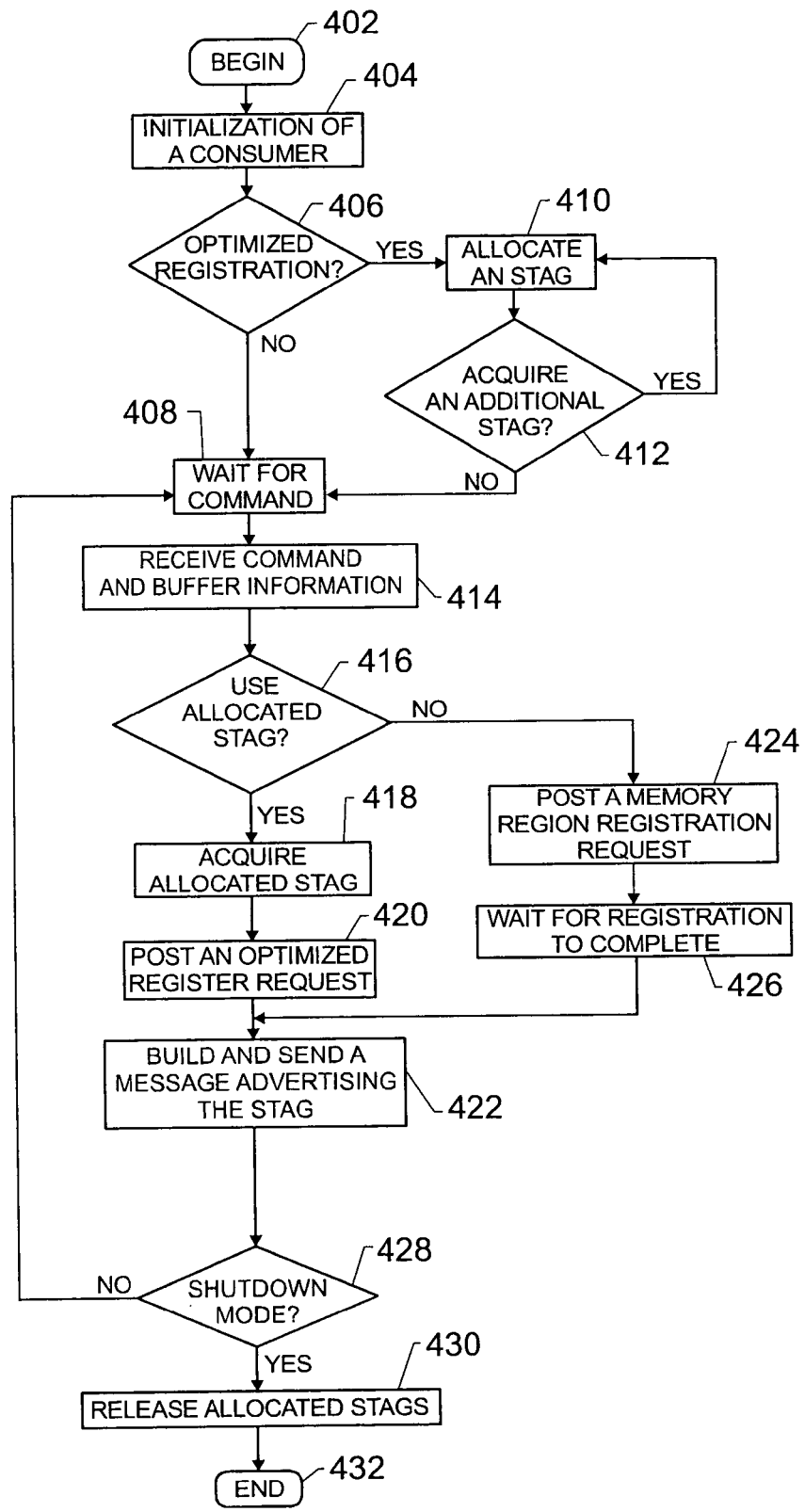
FIG. 4 is a process flow diagram a process in accordance with embodiments of the present invention.

FIG. 4 is a process flow diagram in accordance with embodiments of the present invention. In the diagram, generally referred to by reference numeral 400, an STag may be created and managed by a system, such as a computer system, according to two different memory access schemes or mechanisms. The process may be divided into various phases that relate to the different phases of the operation of the consumer. For instance, the first phase, which may include blocks 402-406 and 410-412, may be an initialization phase that initializes the consumer and allocates resources to the consumer. The second phase, which may include blocks 408 and 414-428, may relate to the normal operation or run time operation of the consumer 301. The final phase, which may include blocks 430 and 432, may relate to the shutdown of the consumer 301.

The first phase of the process begins at block 402. At block 404, an upper layer protocol or consumer 301 may be initialized. The consumer 301 may then determine whether or not to employ the optimized memory registration process at block 406. If the consumer 301 determines not to employ the optimized memory registration, then the consumer 301 may wait for a command to be generated in the second phase of the process, as shown at block 408.

However, if the consumer 301 determines to employ the optimized memory registration feature, then the consumer 301 may issue a command to allocate an STag or a range of STags 306 to the consumer 301, as shown at block 410. The command to allocate the STag or the range of STags may be implemented through the use of verbs or commands. For instance, an "Allocate STag namespace" verb may establish a range of STag values that the consumer 301 may assign without having to go through the memory registration process to allocate individual STags. The consumer 301 may invoke this verb at initialization or prior to the actual use of the STag 306. Beneficially, the STags 306, which may be physical STags, may be managed by the consumer 301 to reduce delays associated with the registration process. After the STag or the range of STags is allocated, the consumer 301 may determine if more STags should be allocated for the use of the consumer 301, as shown at block 412. If the consumer 301 determines that additional STags may be utilized, then execution by the consumer 301 may return to block 410 to allocate an additional STag or range of STags.

However, if the consumer 301 determines that no additional STags are to be utilized, the consumer 301 may wait for a command to be generated during the second phase of the process at block 408. The consumer 301 may receive a command from an application as shown at block 414. The command may include additional information, such as I/O buffer information that relates to the memory to be used with the command. For instance, if the command is an read request or a write request from the consumer 301, then the command may include buffer information may relate to an address to be accessed in the data exchange with a remote node. Also, because the STag 306 may be a physical STag, the verbs and QPs may be modified to indicate that a physical STag is being utilized. For instance, a "Post Send Request" verb may be utilized by an upper layer protocol. The "Post Send Request" verb may include various modifiers or bits, such as a physical SGL modifier or a role modifier. The Physical SGL may indicate that the STag is allocated to the consumer 301 by having a value of "0" or "1." Likewise, the role modifier may indicate the role of the consumer 301. As an example, the consumer 301 may be a requestor if the value of "0" is used, or the consumer 301 may be a non-requestor if the value of "1" is used.

At block 416, the consumer 301 may determine whether to use one of the preallocated STags for the execution of the command. If the consumer 301 uses one of the allocated STags, the consumer 301 may use the physical STag process, as shown in blocks 418 and 420. In block 418, the consumer may acquire one of the allocated STags from the range of STags allocated in block 410. If the allocated STags are being utilized, then the consumer 301 may wait until a previously allocated STag is available. As shown at block 420, the consumer 301 may post a request, such as an "Optimized Register Request," to the RNIC. This request may be used to bind or input information into a TPT entry (such as the TPT entries 314-318 shown in FIG. 3) associated with the allocated STag and the PAT entries (such as the PAT entries 340-344 shown in FIG. 3) that are associated with the TPT entry. This information may include the buffer information, physical address information, length, or other associated information. Once the STag 306 has been allocated, the consumer 301 (via its associated RNIC) may communicate the STag to another consumer or device for a memory operation, as shown at block 422. The consumer 301 may build and send an advertisement message with the STag information, which may depend upon the message format used by the consumer or communication techniques for that consumer 301. Also, in building and sending the message, a setting within the message or a verb may be used to enable or disable the QPs to permit the physical STag access mode.

However, if the consumer 301 does not use one of the allocated STags, the consumer 301 may use the regular process by issuing a command for a memory registration of a memory region, which may be the memory segment 348 (FIG. 3), as shown in block 424. The command may be a memory region registration request to allocate an STag and associate the STag with the consumer 301 and an entry within the TPT table 312. In block 426, once the memory registration of the memory region completes, an STag (such as the STag 306 in FIG. 3) may be allocated and communicated to the consumer 301. That allocated STag may correspond to a TPTE (such as the TPTEs 314-318 of FIG. 3), which may reference the memory region. Once the STag 306 has been allocated, the consumer 301 (via its associated RNIC) may communicate the STag to another consumer or device for a memory operation, as shown at block 422.

Once the message has been transmitted, the command initiated by the STag advertisement may continue to its conclusion and the STag associated with that operation may be returned to the free allocated STag pool by the Consumer 301. Because the set of actions are not directly relevant to the claimed invention, they are not represented in the flow chart. After the access operation is completed, the consumer 301 may determine if the application or consumer 301 is preparing to shutdown or exit run time operation at block 428. If the consumer 301 determines that a shutdown mode is not indicated, then the consumer 301 may continue to wait for another command at block 408. If the STag is a physical STag, then the consumer 301 may reassign the STag 306, automatically invalidate the STag 306 upon completion of the operation, or continue to use the STag 306. By reassigning the STag 306, the STag 306 may be assigned to another TPTE 314-318, which invalidates the previous STag 306 because the STag 306 is assigned to a new SGL.

However, if a shutdown situation is indicated, then the consumer 301 may prepare to shutdown operation and exit the operation phase by releasing the resources associated with it, as shown at block 430. To release the STags, the consumer 301 may issue a verb, such as a "Release STag namespace" verb. This verb may remove control of the range of STags from the consumer 301 and grant control back to the RNIC 208 or 222. Accordingly, the process ends at block 432.

Advantageously, the use of the physical STag may reduce the delay associated with having to wait for the registration process to generate the STag 306 before it may be advertised. By pre-registering the STag range, the consumer 301 may perform back to back operations that consume less time in issuing a command because the memory registration is performed before the command is issued. As such, by using physical STags, explicit memory registration and deregistration for each Input/Output operation or command does not delay the operation of the command. Accordingly, the operation of the system is enhanced by the use of the physical STags, while other methods of distributing the STags may be maintained to provide flexibility to the system.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A memory access mechanism for a node, comprising:
   an upper layer protocol;
   a translation page table for storing data corresponding to a plurality of memory regions in the node; and
   a plurality of steering tags that are controlled by the upper layer protocol, wherein the plurality of steering tags and resources to support the steering tags are allocated to the upper layer protocol that is part of the node prior to a latency sensitive operation, the upper layer protocol assigning at least one of the plurality of steering tags to be associated with at least one of the plurality of memory regions for a memory operation, wherein the assigning is performed in direct response to a request by a consumer.

2. The memory access mechanism set forth in claim 1, wherein the steering tags are allocated by execution of a verb.

3. The memory access mechanism set forth in claim 2, wherein the verb is executed at initialization.

4. The memory access mechanism set forth in claim 2, wherein the verb is executed after initialization.

5. The memory access mechanism set forth in claim 1, wherein the at least one of the plurality of steering tags is associated with an entry in the translation page table that is associated with the at least one of the plurality of memory regions.

6. The memory access mechanism set forth in claim 5, wherein the entry of the translation page table accesses a physical address table to access the at least one of the plurality of memory regions for the memory operation.

7. The memory access mechanism set forth in claim 1, wherein the translation page table uses a tagged offset in a request generated by the upper layer protocol to access the at least one of the plurality of memory regions for the memory operation.

8. The memory access mechanism set forth in claim 1, wherein the upper protocol layer is to further:
   after allocation of the last one steering tag, receive a command for a memory access operation that involves the at least one memory region;
   in response to the request, determine whether or not to use the allocated at least one steering tag; and
   in response to determining that the allocated at least one steering tag is not to be used, acquire the allocated at least one steering tag and submit a request to input information into an entry of the translation page table associated with the allocated at least one steering tag.

9. The memory access mechanism set forth in claim 8, wherein the upper protocol layer is to further:
   in response to determining that the allocated at least one steering tag is not to be used, issue a command for a memory registration to allocate a steering tag and associate such steering tag allocated in response to the command for the memory registration with an entry of the translation page table.

10. A first computer system for communication with a second computer system, comprising:
    a consumer and at least one input/output device;
    wherein the at least one input/output device comprises a memory access mechanism, the memory access mechanism comprising:
      a plurality of buffers associated with the consumer; and
      a plurality of steering tags that are managed by the consumer,
    wherein the consumer is to issue a request to cause allocation of one of the plurality of steering tags to be associated with at least one of the plurality of buffers for a memory access operation, wherein the request is issued to cause allocation of the one steering tag prior to start of the memory access operation that is latency sensitive.

11. The first computer system set forth in claim 10, configured to generate a request for the memory access operation to be transmitted to the second computer system, wherein the request comprises the one of the plurality of steering tags.

12. The first computer system set forth in claim 10, wherein the memory access mechanism is to:
    after allocation of the one steering tag, receive a command for a memory access operation that involves the at least one buffer;
    in response to the request, determine whether or not to use the allocated one steering tag;
    in response to determining that the allocated one steering tag is to be used, acquire the allocated one steering tag and submit a request to input information into an entry of an address translation table associated with the allocated one steering tag.

13. The first computer system set forth in claim 12, wherein the memory access mechanism is to further:
    in response to determining that the allocated one steering tag is not to be used, issue a command for a memory registration to allocate a steering tag and associate such steering allocated in response to the command for the memory registration tag with an entry of the address translation table.

14. A method for providing access to a memory, the method comprising the acts of:
    allocating, by a mechanism in a first node, a plurality of steering tags to an upper layer protocol in the first node, wherein allocating the plurality of steering tags occurs prior to a latency sensitive operation;
    allocating a plurality of buffers associated with the upper layer protocol, wherein the plurality of buffers are part of the first node;
    issuing command to a remote direct memory access network interface card in the first node after the allocation of the plurality of steering tags has been completed;
    associating one of the steering tags to at least one of the plurality of buffers once a command is received at the upper layer protocol which associates buffer information that describes the at least one of the plurality of buffers associated with the one of the plurality of steering tags; and
    advertising the one of the plurality of steering tags without waiting for the association to return a value.

15. The method set forth in claim 14, comprising communicating the one of the plurality of steering tags to a second node.

16. The method set forth in claim 14, comprising performing the command to access at least one of the plurality of buffers once the command is received at the remote direct memory access network interface card.

17. The method set forth in claim 14, wherein the allocation of the plurality of steering tags occurs at an initialization of the first node.

18. The method set forth in claim 14, comprising issuing a verb to perform the allocation of the plurality of steering tags.

19. The method set forth in claim 14, further comprising:

after allocation of the one steering tag, receiving a command for a memory access operation that involves the at least one buffer associated with the one steering tag;

in response to the request, determining whether or not to use the allocated one steering tag; and in response to determining that the allocated one steering tag is to be used, acquiring the allocated one steering tag and submitting a request to input information into an entry of a translation page table associated with the allocated one steering tag.

20. The method set forth in claim 19, further comprising:

in response to determining that the allocated one steering tag is not to be used, issuing a command for a memory registration to allocate a steering tag and associate such steering tag allocated in response to the command for the memory registration with an entry of the translation page table.

* * * * *

UNITED STATES PATENT AND TRADEMARK OFFICE
CERTIFICATE OF CORRECTION

PATENT NO. : 7,617,376 B2  Page 1 of 1
APPLICATION NO. : 10/641127
DATED : November 10, 2009
INVENTOR(S) : Mallikarjun Chadalapaka et al.

It is certified that error appears in the above-identified patent and that said Letters Patent is hereby corrected as shown below:

In column 9, line 48, in Claim 8, delete "last" and insert -- at least --, therefor.

In column 9, line 54, in Claim 8, after "is" delete "not".

In column 10, line 47, in Claim 14, after "issuing" insert -- a --.

Signed and Sealed this

Twenty-sixth Day of January, 2010

David J. Kappos
*Director of the United States Patent and Trademark Office*